US009519412B2

(12) United States Patent
Tamura et al.

(10) Patent No.: US 9,519,412 B2
(45) Date of Patent: Dec. 13, 2016

(54) DISPLAY CONTROL APPARATUS, DISPLAY CONTROL METHOD, PROGRAM, AND INFORMATION STORAGE MEDIUM

(71) Applicant: Sony Computer Entertainment Inc., Tokyo (JP)

(72) Inventors: Keigo Tamura, Tokyo (JP); Masaki Higuchi, Tokyo (JP); Tomoki Takaichi, Tokyo (JP); Toshimasa Aoki, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 106 days.

(21) Appl. No.: 14/516,928

(22) Filed: Oct. 17, 2014

(65) Prior Publication Data
US 2015/0134341 A1 May 14, 2015

(30) Foreign Application Priority Data
Nov. 8, 2013 (JP) ................................ 2013-232598

(51) Int. Cl.
*G10L 21/00* (2013.01)
*G06F 3/0484* (2013.01)
(Continued)

(52) U.S. Cl.
CPC ........... *G06F 3/04842* (2013.01); *G06F 3/167* (2013.01); *G06F 9/4443* (2013.01); *H04N 21/00* (2013.01); *G10L 15/22* (2013.01)

(58) Field of Classification Search
CPC ................................ G10L 15/22; G06F 3/167
(Continued)

(56) References Cited

U.S. PATENT DOCUMENTS

| 2010/0013760 A1* | 1/2010 | Hirai ....................... G10L 15/22 345/156 |
| 2014/0350941 A1* | 11/2014 | Zeigler ................... G06F 3/167 704/275 |
| 2016/0034254 A1* | 2/2016 | LeBeau ................... G06F 3/167 704/275 |

FOREIGN PATENT DOCUMENTS

| JP | 08-006940 | 1/1996 |
| JP | 2001-100878 | 4/2001 |

(Continued)

OTHER PUBLICATIONS

Japanese Notification of Reasons for Refusal dated Sep. 1, 2015 from corresponding Application No. 2013-232598.
(Continued)

*Primary Examiner* — Jakieda Jackson
(74) *Attorney, Agent, or Firm* — Katten Muchin Rosenman LLP

(57) ABSTRACT

A display control apparatus includes: a voice message acceptance block configured to accept a voice message; an option identification block configured to identify, from among a plurality of options related with information indicative of voice messages, in accordance with acceptance of a voice message by the voice message acceptance block, an option of attention that is an option related with information indicative of the accepted voice message and an alternative option other than this option of attention identified on the basis of the information indicative of this voice message or this option of attention; and a display control block configured to display information indicative that the option of attention is in a selected state and information indicative of a voice message by which the option identification block identifies the alternative option as the option of attention in accordance with the acceptance by the voice message acceptance block.

9 Claims, 15 Drawing Sheets

(51) Int. Cl.
  *G06F 9/44*  (2006.01)
  *G06F 3/16*  (2006.01)
  *H04N 21/00*  (2011.01)
  *G10L 15/22*  (2006.01)

(58) Field of Classification Search
  USPC .......................................................... 704/275
  See application file for complete search history.

(56) References Cited

FOREIGN PATENT DOCUMENTS

| | | |
|---|---|---|
| JP | 2002-318597 | 10/2002 |
| JP | 2003-295891 | 10/2003 |
| JP | 2005-044103 | 2/2005 |
| JP | 2013-037688 | 2/2013 |

OTHER PUBLICATIONS

Japanese Notification of Reason for Refusal dated Feb. 2, 2016 from corresponding Application No. 2013-232598.

\* cited by examiner

FIG. 9

| PROGRAM ID | PROGRAM NAME DATA | VENDOR NAME DATA | VOICE COMMAND DATA ||| DATA OF LAST PLAY DATE AND TIME |
| --- | --- | --- | --- | --- | --- | --- |
| | | | FIRST VOICE COMMAND DATA | SECOND VOICE COMMAND DATA | THIRD VOICE COMMAND DATA | |
| 025 | DRAGON GAME 3 | A | DRAGON GAME | DG | DRAGON GAME 3 | 2013/9/6 16:15:30 |
| 013 | DRAGON GAME 2 | A | DRAGON GAME | DG | DRAGON GAME 2 | 2012/7/5 15:36:15 |
| 012 | MUSIC PANIC | B | MUSIC PANIC | MP | MUSIC | 2013/9/10 19:20:36 |

FIG.10

| VOICE COMMAND DATA | PROCESSING CONTENTS DATA |
|---|---|
| START | EXECUTE SELECTED PROGRAM |
| POWER | MOVE TO POWER CONTROL SCREEN |
| TAKE SCREEN SHOT | CAPTURE IMAGE |
| LOG IN | MOVE TO USER SELECT SCREEN |
| DRAGON GAME | FIRST POSITION: IDENTIFY PROGRAM ICON IMAGE 32-4 AS OPTION OF ATTENTION SECOND POSITION: IDENTIFY PROGRAM ICON IMAGE 32-4 AS ALTERNATIVE OPTION |
| DG | |
| DRAGON GAME 3 | |
| DRAGON GAME | FIRST POSITION: IDENTIFY PROGRAM ICON IMAGE 32-7 AS OPTION OF ATTENTION SECOND POSITION: IDENTIFY PROGRAM ICON IMAGE 32-7 AS ALTERNATIVE OPTION |
| DG | |
| DRAGON GAME 2 | |
| MUSIC PANIC | FIRST POSITION: IDENTIFY PROGRAM ICON IMAGE 32-5 AS OPTION OF ATTENTION SECOND POSITION: IDENTIFY PROGRAM ICON IMAGE 32-5 AS ALTERNATIVE OPTION |
| MP | |
| MUSIC | |

| VOICE COMMAND DATA | PROCESSING CONTENTS DATA |
|---|---|
| HOME SCREEN | MOVE TO HOME SCREEN |
| TAKE SCREEN SHOT | CAPTURE IMAGE |
| LOG IN | MOVE TO USER SELECT SCREEN |

FIG.20

| DISPLAY CONTENTS | POSITION | SIZE | CONTENTS TO BE ARRANGED |
|---|---|---|---|
| HOME SCREEN | (x1,y1) | (a1,b1) | ⏻» START   ⏻» POWER  ... |
| PLAY SCREEN (OTHER THAN SCENE IN WHICH DRAGON WAS DEFEATED) | (x2,y2) | (a2,b2) | TO RETURN TO HOME SCREEN ... |
| PLAY SCREEN (SCENE IN WHICH DRAGON WAS DEFEATED) | (x3,y3) | (a3,b3) | TO TAKE SCREEN SHOT ... |

DISPLAY CONTROL APPARATUS, DISPLAY CONTROL METHOD, PROGRAM, AND INFORMATION STORAGE MEDIUM

BACKGROUND

The present disclosure relates to a display control apparatus, a display control method, a program, and an information storage medium.

A technology is known in which a voice message entered from a user is accepted to execute processing in accordance with the information represented by the accepted voice message. In one example of an apparatus based on this technology, information indicative that an option of attention related with information indicative of a voice message to be accepted is identified by highlighting this option is displayed. With this apparatus, upon reception of a voice message indicative of an instruction of execution for example, processing in accordance with an option of attention is executed.

SUMMARY

With related-art technologies, if there are two or more options related with information indicative of a voice message to be accepted, one of these options is identified as an option of attention on the basis of some criteria and information indicative of the selection of the identified option of attention is displayed. In such a case, no guide is given to a user regarding what kind of voice message should be entered to select an alternative option that may have been selected by the user but not actually selected because of failure to comply with the criteria as an option of attention.

In addition, with related-art technologies, if there is such an alternative option other than an option of attention as an option to be recommended to the user, no guide is given to the user regarding what kind of voice message should be entered to identify such an alternative option as an option of attention.

Therefore, the present disclosure addresses the above-identified and other problems associated with related-art methods and apparatuses and it is desirable to provide a display control apparatus, a display control method, a program, and an information storage medium that are configured to guide a user regarding what kind of voice message should be entered to identify an alternative option as an option of attention.

According to an embodiment of the present disclosure, there is provided a display control apparatus including: a voice message acceptance block configured to accept a voice message; an option identification block configured to identify, from among a plurality of options related with information indicative of voice messages, in accordance with acceptance of a voice message by the voice message acceptance block, an option of attention that is an option related with information indicative of the accepted voice message and an alternative option other than this option of attention identified on the basis of the information indicative of this voice message or this option of attention; and a display control block configured to display information indicative that the option of attention is in a selected state and information indicative of a voice message by which the option identification block identifies the alternative option as the option of attention in accordance with the acceptance by the voice message acceptance block.

According to another embodiment of the present disclosure, there is provided a display control method including: accepting a voice message; identifying, from among a plurality of options related with information indicative of voice messages, in accordance with the acceptance of a voice message, an option of attention that is an option related with information indicative of the accepted voice message and an alternative option other than this option of attention identified on the basis of the information indicative of this voice message or this option of attention; and displaying information indicative that the option of attention is in a selected state and information indicative of a voice message by which the alternative option is identified as the option of attention in accordance with the acceptance of the voice message.

According to a further embodiment of the present disclosure, there is provided a program for a computer, the program including: accepting a voice message; identifying, from among a plurality of options related with information indicative of voice messages, in accordance with the acceptance of a voice message, an option of attention that is an option related with information indicative of the accepted voice message and an alternative option other than this option of attention identified on the basis of the information indicative of this voice message or this option of attention; and displaying information indicative that the option of attention is in a selected state and information indicative of a voice message by which the alternative option is identified as the option of attention in accordance with the acceptance of the voice message.

According to a still further embodiment of the present disclosure, there is provided a computer-readable information storage medium storing a program for a computer, the program including: accepting a voice message; identifying, from among a plurality of options related with information indicative of voice messages, in accordance with the acceptance of a voice message, an option of attention that is an option related with information indicative of the accepted voice message and an alternative option other than this option of attention identified on the basis of the information indicative of this voice message or this option of attention; and displaying information indicative that the option of attention is in a selected state and information indicative of a voice message by which the alternative option is identified as the option of attention in accordance with the acceptance of the voice message.

BRIEF DESCRIPTION OF THE DRAWINGS

FIG. 9 is a diagram illustrating one example of program management data;

FIG. 10 is a diagram illustrating one example of command management data;

FIG. 20 is a schematic diagram illustrating one example of arrangement determination rules data;

DETAILED DESCRIPTION OF THE PREFERRED EMBODIMENT

The present disclosure will be described in further detail by way of an embodiment thereof with reference to the accompanying drawings.

Figure 1:
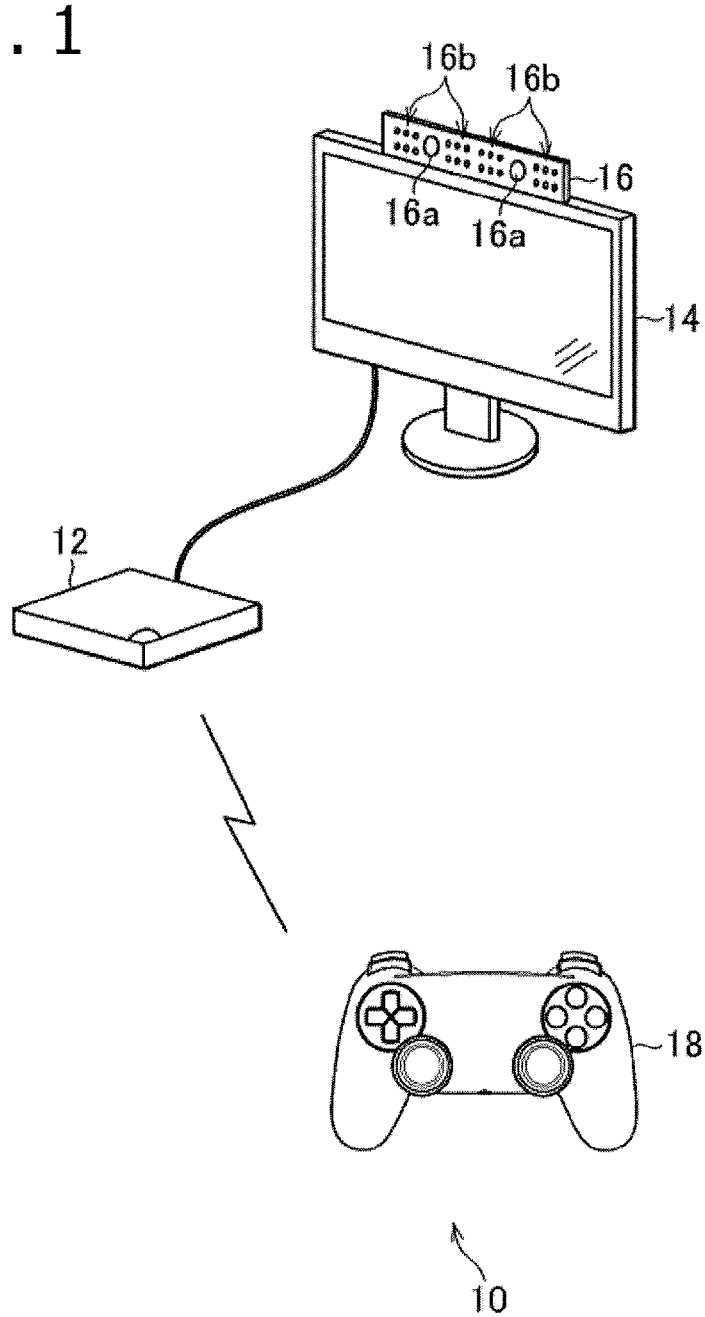
FIG. 1 is a diagram illustrating one example of an overall configuration of an information processing system according to an embodiment of the present disclosure.

FIG. 1 is a diagram illustrating one example of an overall configuration of an information processing system 10 according to an embodiment of the present disclosure. The information processing system 10 has an information processing apparatus 12, a display 14, a camera-microphone unit 16, and a controller 18.

Figure 2:
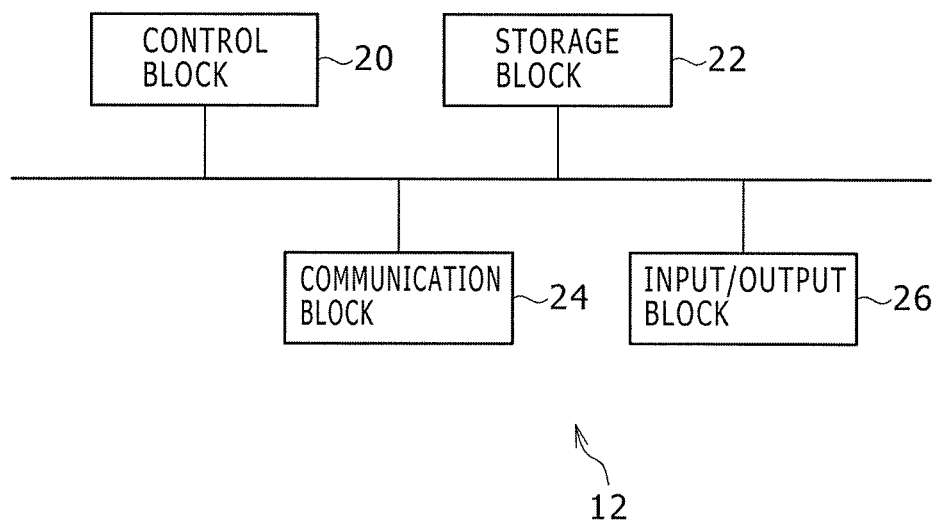
FIG. 2 is a block diagram illustrating one example of a hardware configuration of an information processing apparatus according to the embodiment of the present disclosure.

The information processing apparatus 12 is a computer in an entertainment apparatus such as a game console and has a control block 20, a storage block 22, a communication block 24, and an input/output block 26, for example, as shown in FIG. 2. The control block 20 is a program control device such as a CPU (Central Processing Unit) that operates as instructed by a program installed on the information processing apparatus 12, for example. The storage block 22 is a storage element such as a ROM (Read Only Memory) or a RAM (Random Access Memory) or a hard disk drive, for example. The storage block 22 stores programs and so on that are executed by the control block 20. The communication block 24 is a communication interface such as a network board or a wireless LAN (Local Area Network) module, for example. The input/output block 26 is an input/output port such as an HDMI (registered trademark) (High-Definition Multimedia Interface) port or a USB (Universal Serial Bus) port.

The display 14 is a liquid crystal display for example that displays screens and so on generated by the information processing apparatus 12. In addition, the display 14 also has a speaker through which a voice message represented by voice data generated by the information processing apparatus 12 is sounded. The camera-microphone unit 16 includes a camera 16a configured to output an image of a subject, for example, to the information processing apparatus 12 and a microphone 16b configured to pick up a surrounding voice message, convert this voice message into voice data, and output this voice data to the information processing apparatus 12.

The information processing apparatus 12 and the display 14 are interconnected by an AV (Audio Visual) cable, an HDMI cable, or the like. The information processing apparatus 12 and the camera-microphone unit 16 are interconnected by a USB cable, an AV cable, an HDMI cable, or the like.

Figure 3A:
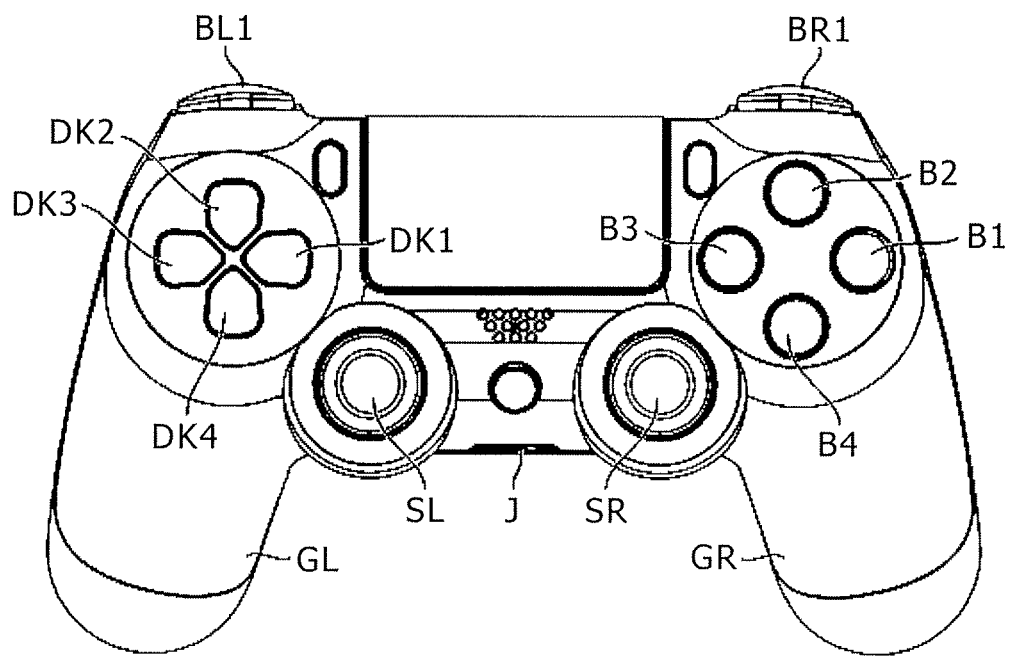
FIG. 3A is a top view illustrating one example of a controller according to the embodiment of the present disclosure.
Figure 3B:
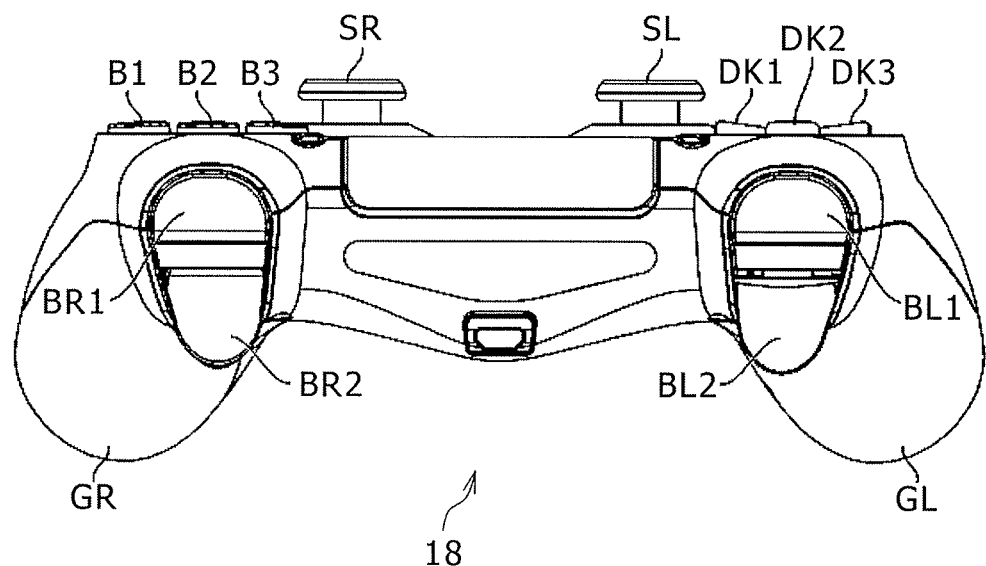
FIG. 3B is a rear view illustrating the controller shown in FIG. 3A.

The controller 18 is an operation input apparatus through which the information processing apparatus 12 is operated by a user. FIG. 3A is a top view illustrating one example of the controller 18. FIG. 3B is a rear view illustrating this controller 18.

As shown in these drawings, the controller 18 has a horizontally long body portion and grips GL and GR that protrude toward the near side (the lower side in FIG. 3B) from the left and right sides, respectively, of the body portion. The user uses the controller 18 by holding the grips GL and GR with the left and right hands, respectively.

Four direction keys DK1 through DK4 and an operation stick SL are arranged in a place at the upper left side of the controller 18 so that the user is able to operate the direction keys DK1 through DK4 and the operation stick SL with his or her left thumb while holding the grip GL with his or her left hand. Four buttons B1 through B4 and an operation stick SR are arranged in a place at the upper right side of the controller 18 so that the user is able to operate the buttons B1 through B4 and the operation stick SR with his or her right thumb while holding the grip GR with his or her right hand. Rear buttons BL1 and BL2 are arranged in a place at the rear left side of the controller 18 so that the user is able to operate the rear buttons BL1 and BL2 with his or her left index finger or middle finger while holding the grip GL with his or her left hand. Rear buttons BR1 and BR2 are arranged in a place at the rear right side of the controller 18 so that the user is able to operate the rear buttons BR1 and BR2 with his or her right index finger or middle finger while holding the grip GR with his or her right hand. The controller 18 further has other controls such as buttons and a touch sensor. Besides, the controller 18 has sensors such as a gyro sensor for angular velocity sensing and an acceleration sensor for acceleration sensing.

In addition, the controller 18 has a jack J into which a plug of a microphone may be inserted to allow voice input through this microphone. A voice message input to the microphone inserted in the controller 18 is converted by the controller 18 into voice data that is outputted to the information processing apparatus 12.

When the user enters a voice message into the microphone 16b of the camera-microphone unit 16, the information processing apparatus 12 recognizes the voice message and accordingly executes various processing operations corresponding to the recognized voice message. Thus, the present embodiment allows the user to operate the information processing apparatus 12 by means of voice messages. It should be noted that, when the plug of the microphone is inserted in the jack J of the controller 18, a result of the recognition of a voice message entered in this microphone is handled in preference to a result of the recognition of a voice message entered in the microphone 16b of the camera-microphone unit 16.

The user is able to execute various operation inputs by use of the controller 18; namely, by pressing direction keys DK1 through DK4, buttons B1 through B4, BL1, BL2, BR1, and BR2 and tilting the operation sticks SL and SR. The controller 18 outputs input data corresponding to the operation inputs to the information processing apparatus 12.

In addition, the controller 18 has a USB port. The controller 18 may connect to the information processing apparatus 12 with a USB cable in order to output input data to the information processing apparatus 12 through the input/output block 26 in a wired manner. Besides, the controller 18 has a wireless communication module or the like to allow the outputting of input data to the information processing apparatus 12 through the communication block 24 in a wireless manner.

Figure 4:
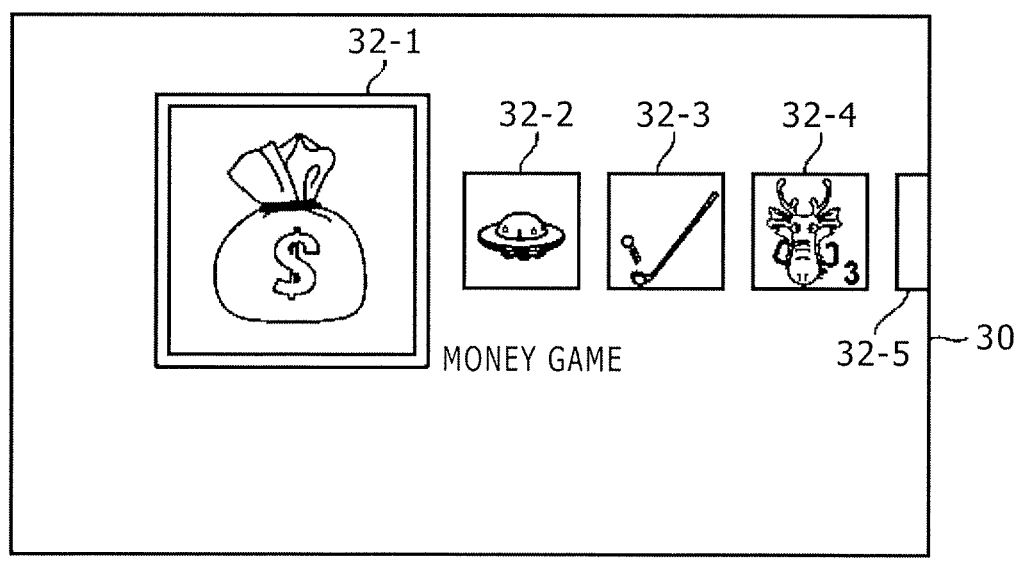
FIG. 4 is a diagram illustrating one example of a home screen.

Referring to FIG. 4, there is shown one example of a home screen 30 that is displayed on the display 14. On the home screen 30, the user can select any one of programs installed on the information processing apparatus 12. For example, suppose that eight game programs are installed on the information processing apparatus 12.

Program icon images 32 (program icon images 32-1 through 32-5 in the example shown in FIG. 4) respectively corresponding to the programs are arranged on the home screen 30 in an initial state as shown in FIG. 4. The program icon images 32 corresponding to some (five, in this example) of the eight programs installed on the information processing apparatus 12 are arranged on the home screen 30 shown in FIG. 4. One of these program icon images 32, the program icon image 32-1 in the example shown in FIG. 4, is in a selected state. The program icon image 32-1 in a selected state is displayed in a manner different from that of the other program icon images 32. In what follows, an option in a selected state is referred to as an option of attention. In the example shown above, the program icon image 32-1 is an option of attention.

As shown in FIG. 4, a character string indicative of the name of the program related with the program icon image 32-1 that is an option of attention is arranged at the lower right of the program icon image 32-1. In addition, the program icon image 32-1 that is an option of attention is highlighted unlike the other program icon images 32 (32-2 through 32-5). To be more specific, the program icon image 32-1 is larger in size than the other program icon images 32 (32-2 through 32-5) and enclosed with a frame. These indications show that the program icon image 32-1 is in a selected state, namely, the program icon image 32-1 is an option of attention. It should be noted that the method of indicating that the program icon image 32-1 is an option of attention is not limited to the one shown in FIG. 4.

Now, suppose that a predetermined time (ten seconds, for example) has passed since the display of the home screen 30 shown in FIG. 4. The home screen 30 shown on the display 14 then gets in a state shown in FIG. 5. Next, the home screen 30 alternates in the states thereof between that shown in FIG. 5 and that shown in FIG. 6 at intervals of a predetermined period of time (three seconds, for example). In the state shown in FIG. 5, a controller operation guide image 34 adapted to guide the contents of operation by the controller 18 is arranged on the home screen 30. On the other hand, in the state shown in FIG. 6, a magic word guide image 36 having given information indicative of a voice message used to start voice recognition is arranged on the home screen 30. FIG. 6 shows a phrase "start voice recognition" as one example of the given information. In what follows, a given phrase indicative of a voice message used to start voice recognition is referred to as a magic word.

In this manner, when a predetermined time has passed since the display of the home screen 30, two guides are given to the user: an operation to be executed by the user through the controller 18; and a voice message to be entered by the user. It should be noted that, if the voice input by the user is disabled, the home screen 30 is not switched to a state in which the magic word guide image 36 is arranged. For example, if the camera-microphone unit 16 is not connected to the information processing apparatus 12 and the plug of a microphone is not inserted in the jack J of the controller 18, the home screen 30 is not switched to a state in which the magic word guide image 36 is arranged.

Figure 5:
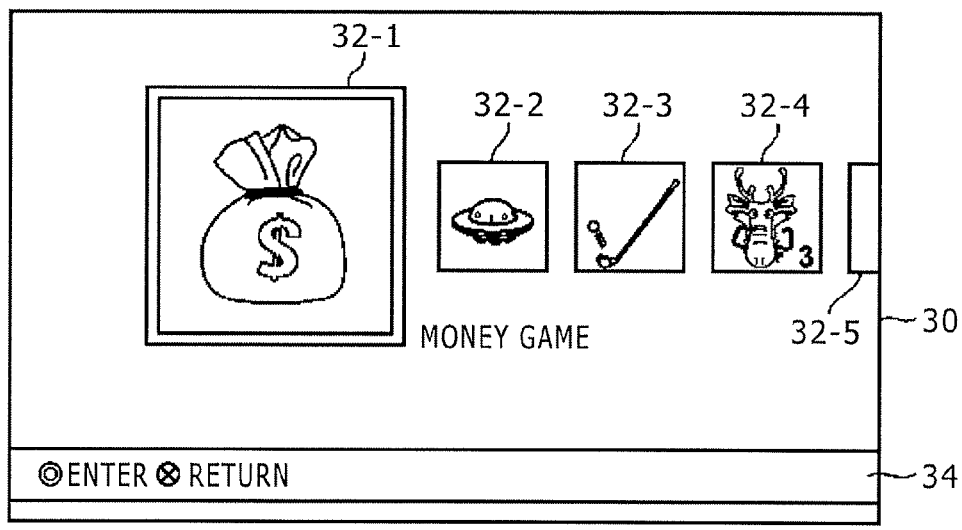
FIG. 5 is a diagram illustrating another example of the home screen.
Figure 6:
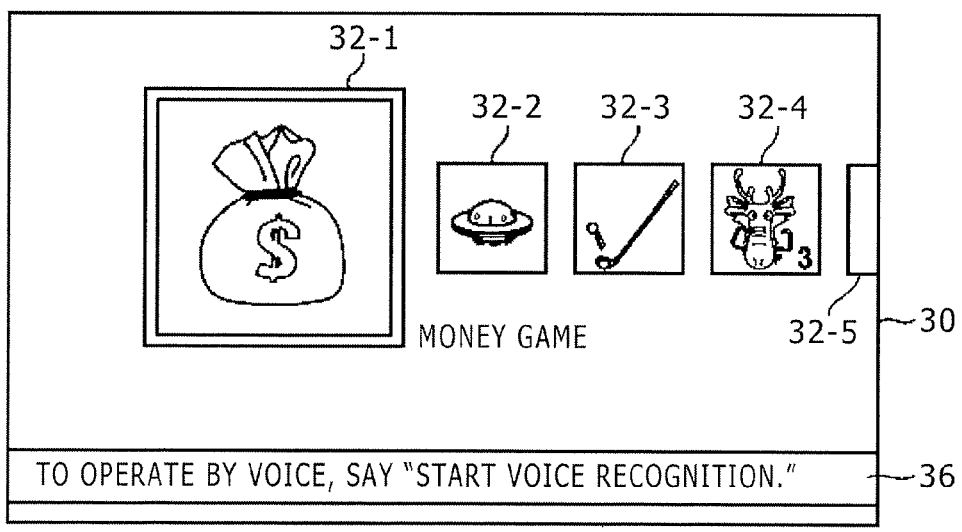
FIG. 6 is a diagram illustrating still another example of the home screen.
Figure 7:
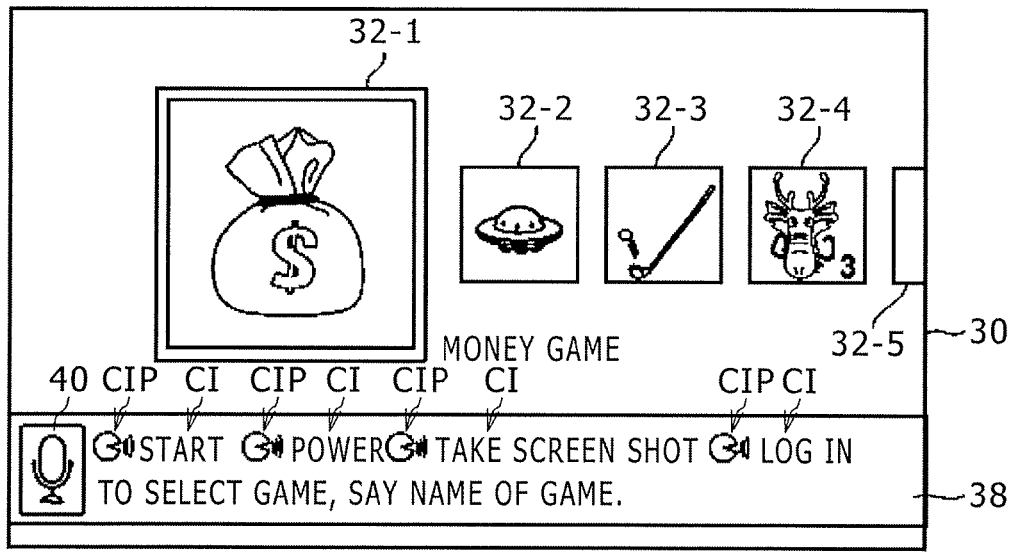
FIG. 7 is a diagram illustrating yet another example of the home screen.

If the information processing apparatus 12 accepts a voice message indicative of magic words when the home screen 30 is in the state shown in FIG. 4, FIG. 5, or FIG. 6, the home screen 30 is switched to a state shown in FIG. 7. Further, if an operation is executed on a predetermined control, the pressing of the rear button BR2 for example, when the home screen 30 is in the state shown in FIG. 4, FIG. 5, or FIG. 6, the home screen 30 is also switched to the state shown in FIG. 7. In the state shown in FIG. 7, a voice input guide image 38 adapted to guide the user for a voice message to be entered is arranged on the home screen 30.

When the home screen 30 gets in a state where the voice input guide image 38 is arranged and the user enters a voice message, the information processing apparatus 12 recognizes information represented by the entered voice message and identifies a command represented by this voice message on the basis of a result of the recognition. Next, the information processing apparatus 12 executes processing corresponding to this command. In what follows, a state in which the voice input guide image 38 is displayed on the screen and the input of a command by a voice message is ready is referred to as a voice command input enabled state. On the other hand, a state in which the voice input guide image 38 is not displayed on the screen and the input of a command by a voice message is not ready is referred to as a voice command input disabled state. As described above, the information processing apparatus 12 may be put into the voice command input enabled state by either the operation of the controller 18 or the voice input of magic words. It should be noted that, while the information processing apparatus 12 is in the voice command input enabled state, the volume of the sound outputted from the speaker may be controlled to a low level.

The information processing apparatus 12 gets in the voice command input disabled state if neither the operation of the controller 18 nor the input by a voice message is executed for a predetermined period of time (ten seconds, for example). The information processing apparatus 12 also gets in the voice command input disabled state if the operation by the controller 18 is executed after the voice command input enabled state becomes on. If the information processing apparatus 12 gets in the voice command input disabled state when the home screen 30 shown in FIG. 7 is shown on the display 14, the displayed home screen 30 is returned to the home screen shown in FIG. 4.

In the voice command input enabled state, a command corresponding to an accepted voice message is identified if the volume of the accepted voice message is within a predetermined volume range. In what follows, suppose that, if the volume of an accepted voice message is equal to or higher than volume L and equal to or lower than volume H, a command corresponding to the accepted voice message is identified. It should be noted that an average value of the volumes of voice messages accepted in a predetermined period of time up to the current time may be handled as the volume of the voice message accepted this time. A volume image 40 representing the volume of a voice message accepted by the information processing apparatus 12 is arranged on the voice input guide image 38 shown in FIG. 7. This volume image 40 is shown on the display 14 in a manner corresponding to the accepted volume, for example. To be more specific, if no voice message is accepted, the background of the volume image 40 is black and the frame thereof is blue, for example. Then, upon acceptance of a voice message, the background turns blue. The blue color of the background of the volume image 40 may become darker as the accepted volume becomes higher.

If the accepted volume is higher than volume H, identification of a command corresponding to the accepted voice message is not executed. Then, the state in which command identification is not executed is indicated by the volume image 40. To be more specific, if the accepted volume is higher than volume H, then the colors of the frame and background of the volume image 40 turn red, for example. Thus, the information processing apparatus 12 can prompt the user to execute command voice input at a proper volume by displaying the volume image 40 on the display 14 in a manner corresponding to the accepted volume. It should be noted that, in what follows, the user is assumed to execute voice input with the above-mentioned predetermined volume range, namely, equal to or higher than volume L and equal to or lower than volume H for example.

In the voice input guide image 38 shown in FIG. 7, at least one piece of command information CI indicative of a command is arranged. In the present embodiment, phrases indicative of commands are arranged for command information CI. It should be noted that, for command information CI, another type of information such as an icon image indicative of a command may be arranged instead of phrases.

Command information CI is related with each command that may be accepted by the information processing apparatus 12. When a voice message represented by command information CI is entered by the user, processing corresponding to a command related with this command information CI is executed.

Four pieces of command information CI are arranged in the home screen 30 shown in FIG. 7. A command identification image CIP is arranged on the left of each piece of command information CI arranged in the home screen 30. The command identification image CIP allows the user to recognize that, by entering a voice message indicated by the command information CI on the right of the command identification image CIP, processing corresponding to a command related with this command information CI is executed.

In addition, each command represented by command information CI is allocated with a control such as a button of the controller 18. Pressing the allocated button executes the processing corresponding to a command related with this button. Thus, the processing corresponding to a command represented by command information CI may be executed by either the operation of a control or the inputting of a voice message.

Besides, each of the displayed program icon images 32 is related with at least one piece of information such as the name, abbreviated name, and popular name of a program related with this program icon image 32. When the user enters a voice message indicative of the name or the like of a program, the program icon image 32 corresponding to this program is identified as an option of attention. If an entered voice message is indicative of the names or the like of two or more programs, the program icon image 32 related with any one of these programs is identified as an option of attention. If a voice message indicative of a phrase "dragon game" is accepted by the information processing apparatus 12 with the home screen 30 shown in FIG. 7 displayed, the home screen 30 is switched to a state shown in FIG. 8. Six program icon images 32 (32-3 through 32-8) are arranged on the home screen 30 shown in FIG. 8. If the program icon image 32-4 is identified as an option of attention, the program icon image 32-4 is displayed in a highlighted manner on the home screen 30 shown in FIG. 8.

Further, if an entered voice message is indicative of the names or the like of two or more programs, then, of the program icon images 32 corresponding to these programs, one of the program icon images 32 other than the option of attention is identified as an alternative option. The name of the program corresponding to the alternative option is then arranged in the voice input guide image 38. In the example shown in FIG. 8, alternative option information AI indicative of the name of the program corresponding to the program icon image 32-7 is arranged in the voice input guide image 38. In the example shown in FIG. 8, the name "dragon game 2" is included in the alternative option information AI.

The identification of an option of attention and an alternative option is executed on the basis of program management data shown in FIG. 9 and command management data shown in FIG. 10.

As shown in FIG. 9, program management data include program. ID (Identification Data), program name data, vendor name data, voice command data, last play date and time data, and the like. Program ID is identification information about a program. Program name data is indicative of the name of a program concerned. Vendor name data is indicative of the name of the vendor of the program concerned. Voice command data is indicative of information about a command for the program icon image 32 corresponding to the program concerned to be identified as an option of attention or an alternative option. A value of at least one piece of voice command data indicative of the name, abbreviated name, or a popular name of a program, for example, may be set for each program. FIG. 9 shows, as one example, program management data including the values of three pieces of voice command data, namely, the value of first voice command data, the value of second voice command data, and the value of third voice command data. In addition, a character string indicative of an accepted voice message is set as the value of voice command data. The last play date and time data is indicative of the date and time on which a program concerned was played last.

In the present embodiment, a character string indicative of the name of a program concerned is set as the value of any one piece of voice command data related with each program. In the example shown in FIG. 9, the character strings indicative of the names concerned are set as the value of the third voice command data for a program named "dragon game 3" and a program named "dragon game 2."

Command management data shown in FIG. 10 is generated on the basis of the program management data shown in FIG. 9. Command management data manages the relation between an accepted voice message and processing to be executed in accordance with the accepted voice message. As shown in FIG. 10, command management data include voice command data indicative of an accepted voice message and processing contents data indicative of the processing to be executed in accordance with the accepted voice message. In FIG. 10, character strings indicative of accepted voice messages are shown as the values of voice command data.

In the present embodiment, the value of the first voice command data, the value of the second voice command data, and the value of the third voice command data set in the program management data are set as the values of the voice command data in the command management data. Thus, three pieces of voice command data related with one program are set in the command management data. In the command management data, data indicative of two processing operations ranked for a program is set as the value of processing contents data related with the three pieces of voice command data corresponding to the program. In the example shown in FIG. 10, processing of identifying the program icon image 32 corresponding to a program concerned as an option of attention is set as the first-place processing and processing of identifying the program icon image 32 as an alternative option is set as the second-place processing.

In the command management data, a character string indicative of a voice message represented by command information CI arranged in the screen is also set as the value of voice command data. In addition, in the command management data, the data indicative of the processing to be executed when a voice message represented by the voice command data is accepted is set as the value of the processing contents data related with this voice command data.

In the command management data, the processing indicated by the processing contents data related with the voice command data indicative of an accepted voice message is executed.

Figure 8:
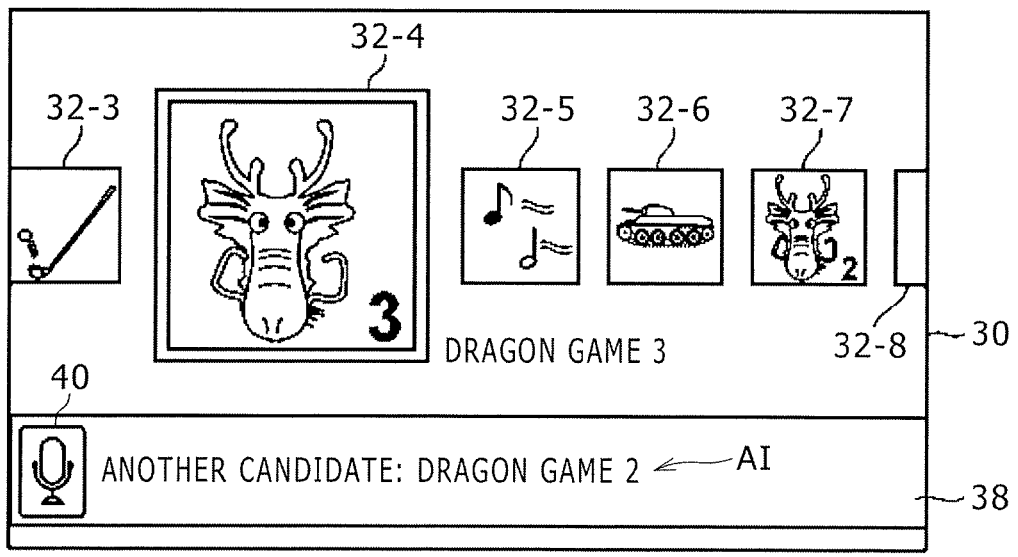
FIG. 8 is a diagram illustrating a different example of the home screen.

For example, when the information processing apparatus 12 accepts a voice message indicative of a phrase "start" with the home screen 30 shown in FIG. 8 shown on the display 14, the execution of a program related with the program icon image 32-4 that is an option of attention starts. If the information processing apparatus 12 accepts a voice message indicative of a phrase "power," a power control screen 44 (refer to FIG. 17) is shown on the display 14. When the information processing apparatus 12 accepts a voice message indicative of a phrase "take screen shot," a capture image with display contents of the home screen 30 captured as a still image is stored in the storage block 22 of the information processing apparatus 12. When a voice message indicative of a phrase "log in" is accepted by the information processing apparatus 12, a screen showing a user list is shown on the display 14. When a user identifier registered in the information processing apparatus 12 is entered by voice on this screen, a login operation by the user is executed.

As shown in FIG. 10, two or more pieces of voice command data indicative of a same character string may be related with different processing operations in command management data. These pieces of voice command data are referred to as doubly set voice command data. For example, the voice command data with the value being "dragon game" and the voice command data with the value being "DG" shown in FIG. 10 are doubly set voice command data.

If the voice command data represented by an accepted voice message is doubly set voice command data, then the priorities of programs are determined on the basis of a predetermined criterion.

In the determination of program priorities, processing operations related with doubly set voice command data are identified first. Then, a program related with the program icon image 32 identified as an option of attention or an alternative option in the processing operation concerned is identified. For example, if the accepted voice message is "dragon game," then programs with the name being "dragon game 3" and the name being "dragon game 2" are identified. Then, of the identified programs, the program executed most recently is determined to be the program of the top priority and the program executed second most recently is determined to be the program of the second priority. For example, the program with date and time indicated by the last play date and time data in program management data being most recent is determined to be the program of the top priority and the program with date and time indicated by the last play date and time data in program management data being the second recent is determined to be the program of the second priority. Program priorities are determined in the above-described manner. It should be noted that the method of determining program priorities is not limited to that mentioned above.

The processing that is set as the processing of the top priority in the processing contents data related with the program of the top priority and the processing that is set as the processing of the second priority in the processing contents data related with the program of the second priority are executed. Here, for example, the processing of identifying the program icon image 32 related with the program of the top priority as the option of attention and the processing of identifying the program icon image 32 related with the program of the second priority as the alternative option are executed. It should be noted that, in the present embodiment, the processing related with the program that was executed most recently or second recently is executed; however, the processing related with the program that was executed third or less recently is not executed.

For example, if an accepted voice message is representative of "dragon game" or "DG," then the program icon image 32-4 is identified as an option of attention and the program icon image 32-7 is identified as an alternative option in accordance with the above-mentioned criterion. On the basis of the option of attention and alternative option identified as described above, the home screen 30 shown in FIG. 8 is generated to be shown on the display 14.

Now, suppose that, while the home screen 30 shown in FIG. 8 is displayed, a voice message representative of a phrase "dragon game 2" arranged as alternative option information AI on the home screen 30 is accepted. In this case, one piece of voice command data with the value being "dragon game 2" existing in the command management data shown in FIG. 10 is identified. In the command management data, the processing of identifying the program icon image 32-7 corresponding to "dragon game 2," related with the identified voice command data as the processing of the top priority as an option of attention is then executed. As a result, the home screen 30 with the program icon image 32-7 identified as the option of attention highlighted is displayed.

For example, the user sometimes wants to execute a program related with an alternative option rather than a program related with an option of attention. To be more specific, the user sometimes wants to play a game named "dragon game 2" rather than a game named "dragon game 3," for example. In preparation for this, information indicating that an option of attention is selected and alternative option information AI that is information indicative of a voice message upon reception of which an alternative option is identified as an option of attention are displayed. When the user enters the voice message represented by the alternative option information AI, the alternative option concerned is identified as an option of attention. A state is then entered in which the program icon image 32 newly identified as an option of attention is selected. Thus, the user is guided regarding what kind of voice message should be entered to identify an alternative option as an option of attention.

In addition, information indicative of a voice message related with any one of the values of two or more pieces of voice command data related with an alternative option may be arranged as alternative option information AI as described above. At the same time, information indicative of a voice message related with a value different from the value of the voice command data related with an option of attention may be arranged as alternative option information AI. This setup allows prevention of the current option of attention from being identified as an option of attention again even when the user enters a voice message indicated by alternative option information AI.

It is also practicable to identify an option related with a program recently executed as an option of attention or an alternative option. To be more specific, as described above, among two or more options related with programs, the option related with the program executed most recently may be identified as an option of attention, for example. Also, the option related with the program executed second recently may be identified as an alternative option. This setup identifies more recently executed programs as options of attention or alternative options of higher priorities. Generally, there is a strong tendency that programs that the user wants to execute are those executed recently. Therefore, the setup described above makes higher the possibility of identifying an option related with a program that the user wants to execute as an option of attention or an alternative option.

It should be noted that an option of attention or an alternative option may be identified on the basis of the values of attributes related with programs, i.e., the values of attributes other than the timings at which the programs were last executed. For example, on the basis of the attributes related with a program, an option identified as the option of the top priority may be identified as an option of attention and an option identified as the option of the second priority may be identified as an alternative option. In this manner, if there are two or more options related with voice command data representative of an accepted voice message, it is determined which one of the options is to be identified as an option of attention or an alternative option on the basis of the values of attributes related with the options.

Further, an option of attention or an alternative option may be identified on the basis of the values of attributes that may be set by a program user or vendor. In this case, if there are two or more options related with voice command data representative of an accepted voice message, the program user or vendor can control which one of the options is to be identified as an option of attention or an alternative option.

In the description above, an option related with the information representative of an accept voice message is identified as an alternative option; however, it is also practicable that an option related with an option of attention is identified as an alternative option. To be more specific, an option determined as an option to be recommended to the user in accordance with an identified option of attention may be identified as an alternative option, for example. Here, if there are two or more options to be recommended to the user, for example, one of the options may be identified as an alternative option on the basis of the values of attributes such as the dates and times at which programs related with the options were last executed. Further, an option related with one of the programs provided by the same vendor as the program related with an option of attention may be identified as an alternative option, for example. These setups guide the user regarding what kind of voice message should be entered to identify an option related with an option of attention as an alternative option.

Further, the value of voice command data that is the information representative of a voice message related with an option related with a program may be the information set by the vendor of the program related with the option concerned, for example. This setup allows the vendor of the program to set, as a value of voice command data, the abbreviated name or the like of the program concerned that is generally used by users, thereby creating a situation in which the program concerned is easily selected as an option of attention or an alternative option, for example.

If the information processing apparatus 12 accepts a voice message indicative of a phrase "start" when the home screen 30 shown in FIG. 8 is displayed, the execution of a program related with the program icon image 32-4 in a selected state is started. In the present embodiment, the execution of the game program named "dragon game 3" is started. At this time, the value of last play date and time data related with the program concerned in the program management data is updated to the current date and time.

Figure 11:
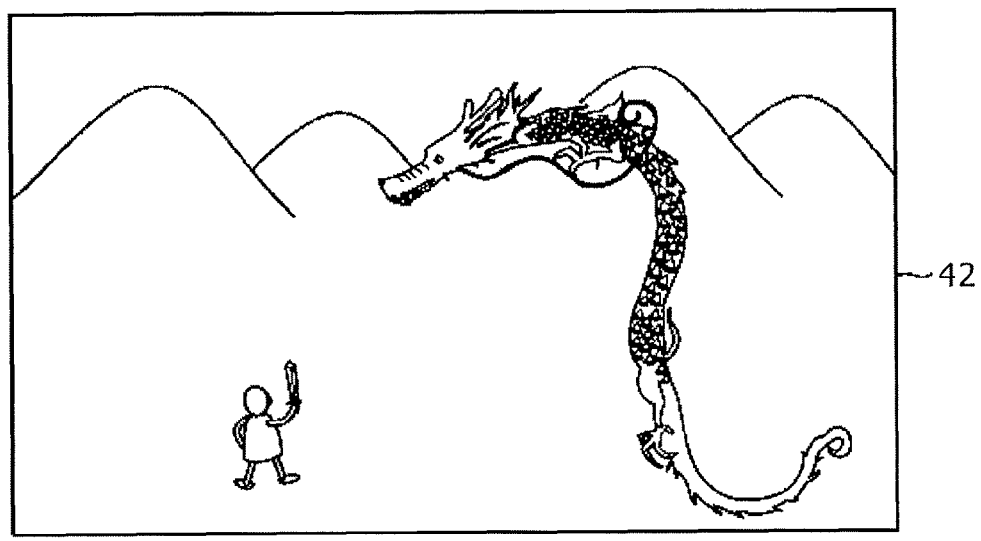
FIG. 11 is a diagram illustrating one example of a play screen.
Figure 12:
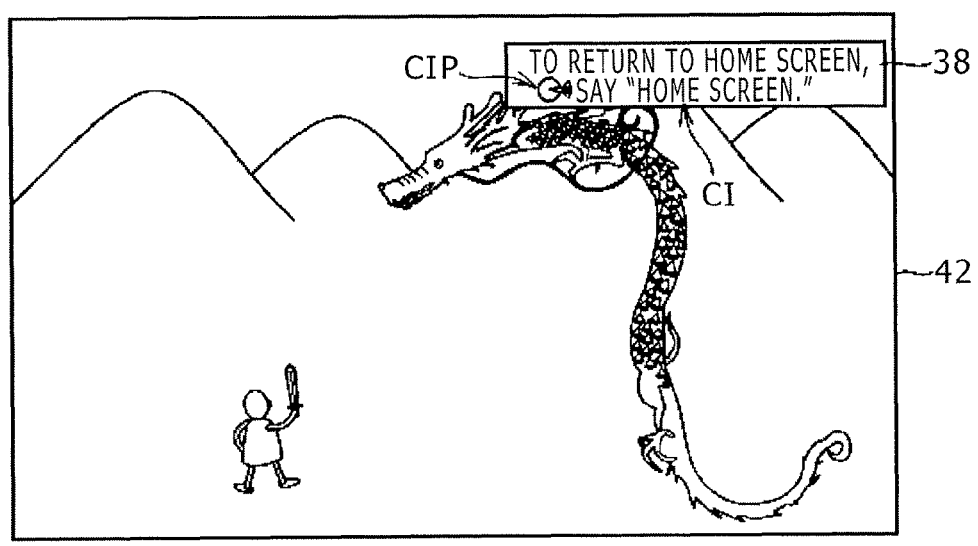
FIG. 12 is a diagram illustrating another example of the play screen.

Referring to FIG. 11, there is shown one example a play screen 42 that is generated at the time of the execution of the game program concerned and shown on the display 14. When the play screen 42 shown in FIG. 11 is displayed, the information processing apparatus 12 is in a voice command input disabled state. Now, for example, when the information processing apparatus 12 accepts a magic word, the information processing apparatus 12 is switched to a voice command input enabled state. Then, the play screen 42 is switched to a state in which the voice input guide image 38 is displayed as shown in FIG. 12. Command information CI indicative of a command for returning to the home screen 30 is arranged in the voice input guide image 38 shown in FIG. 12. At the left side of the command information CI concerned, a command identification image CIP is arranged.

Figures 13, 14:
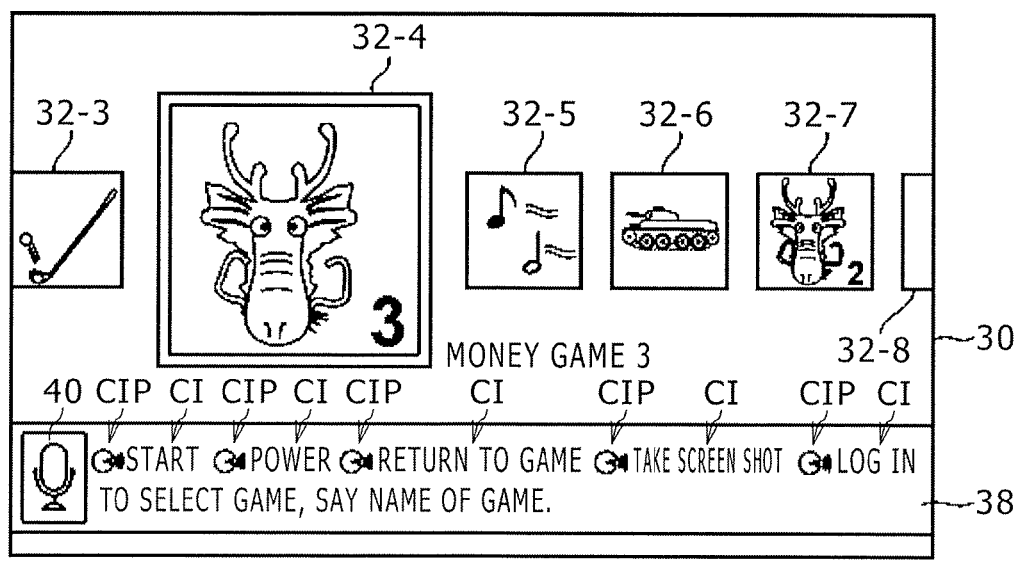
FIG. 13 is a diagram illustrating another example of command management data.
FIG. 14 is a diagram illustrating a further example of the home screen.
Figure 15:
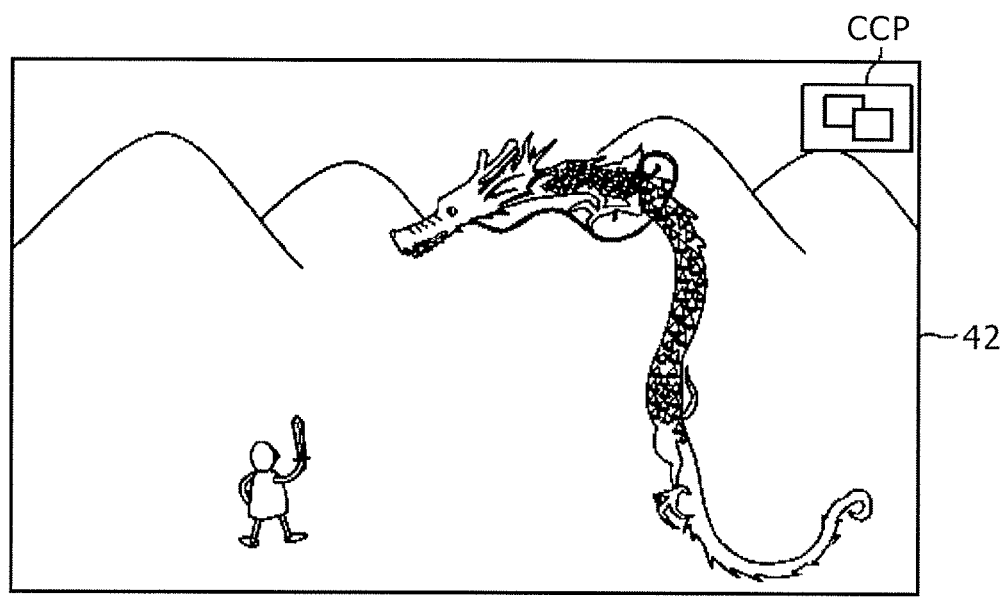
FIG. 15 is a diagram illustrating still another example of the play screen.

Referring to FIG. 13, there is shown one example of command management data in effect when the play screen 42 shown in FIG. 12 is displayed. When the play screen 42 shown in FIG. 12 is displayed, a processing operation that is executed on the basis of the command management data shown in FIG. 13 is determined.

When the information processing apparatus 12 accepts a voice message indicative of a phrase "home screen" while the play screen 42 shown in FIG. 12 is displayed, the screen displayed at that time is switched to the home screen 30 shown in FIG. 14. The voice input guide image 38 arranged in the home screen 30 shown in FIG. 14 is basically the same as that shown in FIG. 7. However, the voice input guide image 38 shown in FIG. 14 is added with command information CI indicative of a command for returning to the play screen 42, the phrase indicative of the command being "return to game." Here, if the information processing apparatus 12 accepts a voice message indicative of the phrase "return to game," then the home screen 30 shown in FIG. 14 is switched to the play screen 42. It should be noted that processing operations corresponding to other commands that are executable when the home screen 30 shown in FIG. 14 is displayed can be executed by the same voice input as that when the home screen 30 shown in FIG. 7 is displayed.

If the information processing apparatus 12 accepts a voice message indicative of a phrase "take screen shot" when the play screen 42 shown in FIG. 12 is displayed, a capture image with the display contents on the play screen 42 captured is stored in the storage block 22 of the information processing apparatus 12. When the capture image is stored in the storage block 22, the play screen 42 with a capture completed image CCP indicative that the image has been stored arranged in the upper right corner is displayed for a predetermined period of time. The information processing apparatus 12 is then switched to a voice command input disabled state. If the information processing apparatus 12 accepts a voice message indicative of a phrase "log in," a screen showing a user list is shown on the display 14. These processing operations are set to the command management data shown in FIG. 13. Thus, in the present embodiment, some of the processing operations according to commands with corresponding command information CI not displayed can be executed by voice input.

For example, suppose that command information CI is arranged at the same position in the play screen 42 as the position in the home screen 30 shown in FIG. 7 or FIG. 14. Then, if an object of a player or the like is displayed at the bottom of the play screen 42 as shown in FIG. 11, for example, the command information CI may interfere with the view of the user playing the game. In the present embodiment, the information processing apparatus 12 arranges command information CI at a position in the screen suitable for display contents as described above. To be more specific, for example, the voice input guide image 38 is arranged at the bottom in the home screen 30 while it is arranged in the upper right corner in the play screen 42. Thus, the possibility that command information CI arranged in the screen hinders the view of the user playing the game can be lowered.

In addition, the information processing apparatus 12 hides display contents in an area of suitable size for display contents in the screen by the voice input guide image 38. To be more specific, for example, when the play screen 42 of a game is displayed, display contents in a screen area smaller than that in the case of the home screen 30 for selection of a game to play are hidden and command information CI is arranged in the hidden area. This setup reduces the possibility of hindering the user view by the command information CI arranged in the screen, while making it easy for the user to view the command information CI.

Besides, the information processing apparatus 12 controls whether to arrange command information CI corresponding to a certain command in accordance with the display contents on the screen. To be more specific, for example, the command information CCP indicative of a command of storing a capture image with the display contents on the screen captured is arranged in the home screen 30 shown in FIG. 7 or FIG. 14, but not arranged in the play screen 42 shown in FIG. 12. However, even if the play screen 42 shown in FIG. 12 is displayed, the information processing apparatus 12 executes the processing of storing a capture image with the display contents on the play screen 42 captured when the information processing apparatus 12 accepts a voice message indicative of a phrase "take screen shot." As described above, in the case where the area in which command information CI is arranged is desired as small as possible, for example, the command information CI on part of a command that can be accepted by voice input may not be displayed. If the size of the area in which command information CI is arranged is saved in this manner, the possibility of hindering the user view by the command information CI arranged on the screen is further lowered.

Figure 16:
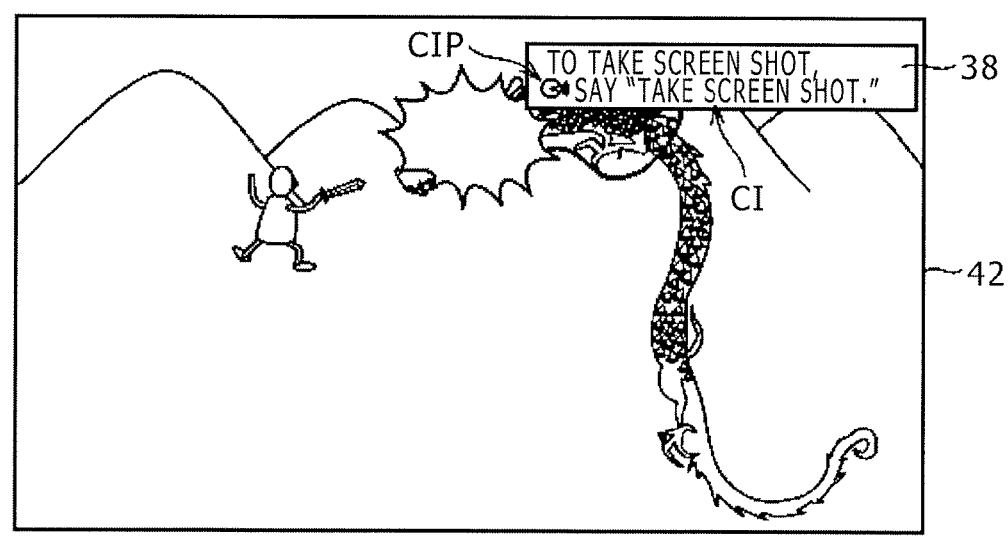
FIG. 16 is a diagram illustrating yet another example of the play screen.

The information processing apparatus 12 may control whether to arrange command information CI in accordance with the display contents on the screen for each of two or more pieces of command information CI. For example, as shown in FIG. 16, depending on the display contents on the screen, the information processing apparatus 12 may arrange the command information CI indicative of a command of storing a capture image with the display contents on the screen captured onto the screen instead of the command information CI indicative of a command of returning to the home screen 30. FIG. 16 shows as one example a scene in which a dragon is defeated in a game. In such a scene, the possibility that the user wants to store a capture image becomes high. Therefore, in such a scene, the command information CI indicative of a command of storing a capture image with the display contents on the screen captured may be arranged on the screen.

If the information processing apparatus 12 accepts a voice message indicative of a phrase "take screen shot" when the play screen 42 shown in FIG. 16 is displayed, a capture image with the display contents on the play screen 42 captured may be stored in the storage block 22. When the information processing apparatus 12 accepts a voice message indicative of a phrase "home screen," the display screen may be switched to the home screen 30 shown in FIG. 14.

Figure 17:
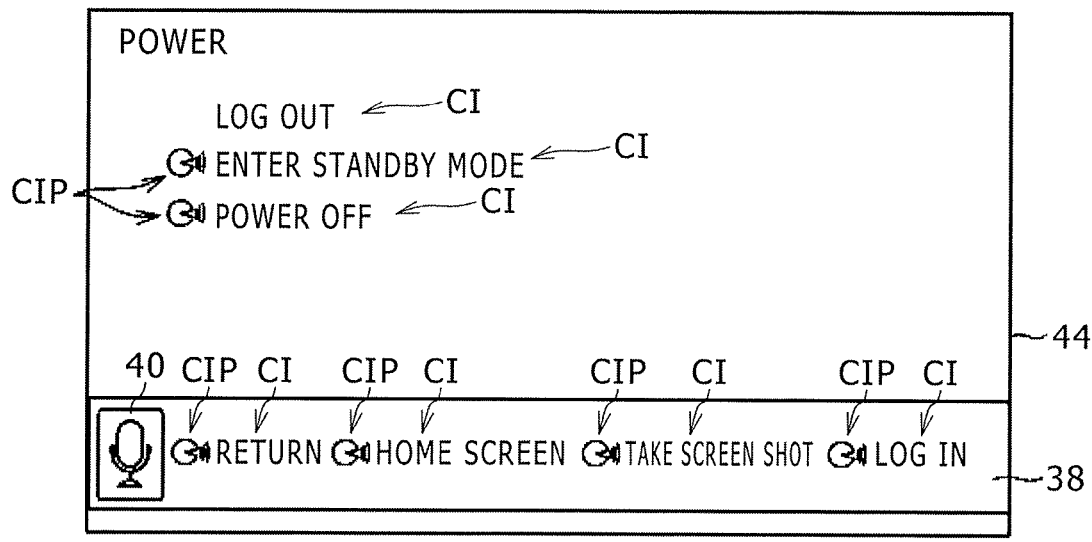
FIG. 17 is a diagram illustrating one example of a power control screen.

When the home screen 30 shown in FIG. 7, FIG. 8, or FIG. 14 is displayed as described above, if the information processing apparatus 12 accepts a voice message indicative of a phrase "power," the power control screen 44 shown in FIG. 17 is shown on the display 14. If the power control screen 44 shown in FIG. 17 is displayed, the information processing apparatus 12 remains in a voice command input enabled state.

The voice input guide image 38 in which four pieces of command information CI are arranged is arranged in the power control screen 44 shown in FIG. 17. At the left side of these pieces of command information CI, command identification images CIP are arranged. In addition to the command information CI arranged in the voice input guide image 38, the command information CI corresponding to a logout command, a standby command, and a power-off command are arranged in the power control screen 44. At the left side of the command information CI corresponding to a standby command and the command information CI corresponding to a power-off command, command identification images CIP are arranged.

If the information processing apparatus 12 accepts a voice message indicative of a phrase "enter standby mode," the information processing apparatus 12 gets in a standby mode. If the information processing apparatus 12 accepts a voice message indicative of a phrase "power off," the power of the information processing apparatus 12 is turned off. In this manner, the power of the information processing apparatus 12 is turned off by voice input.

It should be noted that, in the present embodiment, logout processing cannot be executed by voice input. The user can recognize this setup by that no command identification image CIP is arranged at the left side of the command information CI indicative of the logout command.

Figure 18:
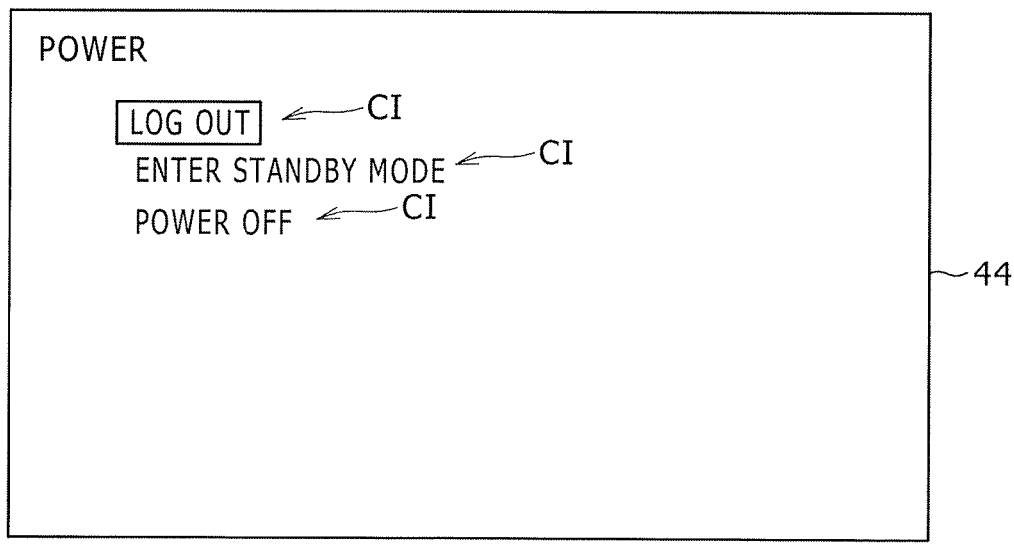
FIG. 18 is a diagram illustrating another example of the power control screen.

If an operation is executed through the controller 18 when the power control screen 44 shown in FIG. 17 is displayed, the information processing apparatus 12 gets in a voice command input disabled state, in which the displayed power control screen 44 is switched to a state shown in FIG. 18. On the power control screen 44 shown in FIG. 18, the voice input guide image 38 is not arranged. In addition, command identification images CIP arranged at the left side of the command information CI corresponding to the standby command and the command information CI corresponding to the power-off command are deleted. Around the command information CI indicative of the logout command arranged on top is enclosed with a frame indicating that this command is in a selected state. The user is able to select, from among the commands corresponding to these three pieces of command information CI shown in FIG. 18, a command corresponding to the processing to be executed by operating the controller 18. When a predetermined operation is executed, namely, when the button B1 is pressed for example, the processing in accordance with the command corresponding to the command information CI that is in a selected state is executed.

In the exemplary description above, a capture image with display contents captured by voice input is stored as a still image in the storage block 22. However, a moving image with display contents captured by voice input in the information processing apparatus 12 may be stored. To be more specific, if, for example, the information processing apparatus 12 accepts a voice message indicative of a phrase "start recording," screen capture may be started; if the information processing apparatus 12 accepts a voice message indicative of a phrase "end recording," screen capture may be ended. The information processing apparatus 12 may store the moving image made up of a series of images captured between capture start and capture end into the storage block 22 of the information processing apparatus 12 as a capture moving image.

Further, any one of two or more predetermined languages may be set as a system language in the information processing apparatus 12. However, some of these two or more languages are incompatible with the voice recognition of the present embodiment. If any one of these languages that are incompatible with the voice recognition is set as the system language, information indicative that such the set language is incompatible with the voice recognition is shown on the display 14. In this case, a language alternative to the language concerned, English for example, is set as the language for voice recognition. Then, the command information CI indicative of commands that can be accepted by voice input is displayed in the language set as the language for voice recognition.

The following further describes command information CI arrangement control and specific processing of options of attention and alternative options.

Figure 19:
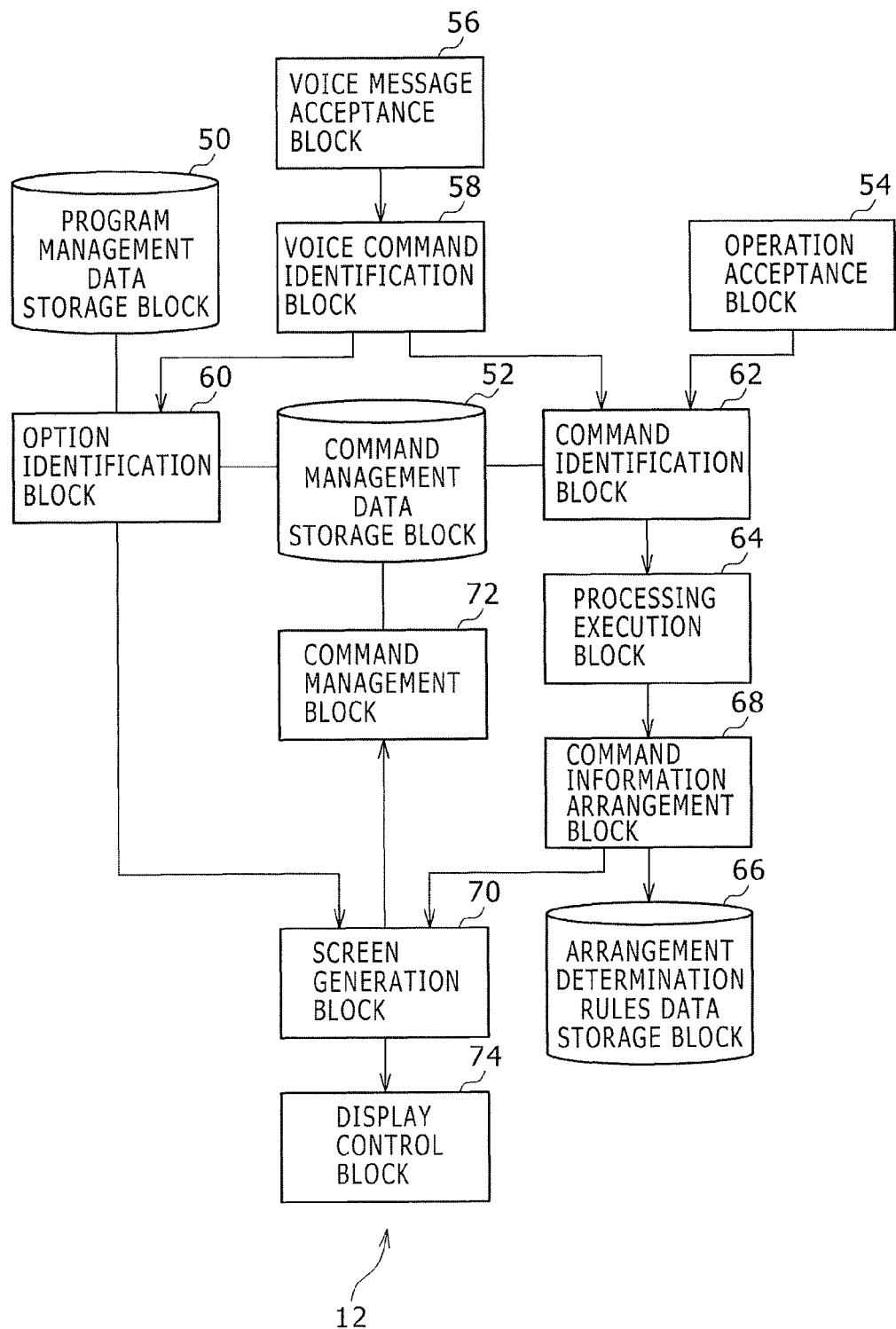
FIG. 19 is a functional block diagram illustrating one example of functions that are realized by the information processing apparatus according to the embodiment of the present disclosure.

FIG. 19 is a block diagram illustrating one example of functions associated with command information CI arrangement control and specific processing of options of attention and alternative options, these functions being installed on the information processing apparatus 12 according to the present embodiment. It should be noted that all of the functions shown in FIG. 19 need not be installed and functions other than those shown in FIG. 19 may be installed.

As shown in FIG. 19, the information processing apparatus 12 according to the present embodiment functionally has a program management data storage block 50, a command management data storage block 52, an operation acceptance block 54, a voice message acceptance block 56, a voice command identification block 58, an option identification block 60, a command identification block 62, a processing execution block 64, an arrangement determination rules data storage block 66, a command information arrangement block 68, a screen generation block 70, a command management block 72, and a display control block 74, for example. The program management data storage block 50, the command management data storage block 52, and the arrangement determination rules data storage block 66 are installed as parts of the storage block 22. The voice message acceptance block 56 is installed as part of the input/output block 26. The operation acceptance block 54 is installed as part of the communication block 24 or the input/output block 26. The display control block 74 is installed as part of the input/output block 26. The other functions are installed as parts of the control block 20.

The above-mentioned functions are installed by executing, by the control block 20, a program including instructions corresponding to these functions installed in the information processing apparatus 12 that is a computer. This program is provided to the information processing apparatus 12 via a computer-readable information storage medium such as an optical disk, a magnetic disk, a magnetic tape, a magneto-optical disk, or a flash memory, or via communication means such as the Internet.

The program management data storage block 50 stores program management data illustrated in FIG. 9.

The command management data storage block 52 stores command management data illustrated in FIG. 10 and FIG. 13. The command management block 72 to be described later updates command management data in accordance with executed processing and display contents of the screen. For example, when the home screen 30 is displayed, the command management data illustrated in FIG. 10 is stored in the command management data storage block 52. On the other hand, when the play screen 42 is displayed, the command management data illustrated in FIG. 13 is stored in the command management data storage block 52.

The operation acceptance block 54 accepts operations executed on the controller 18. In the present embodiment, the operation acceptance block 54 accepts a signal and the like indicative of a pressed button for example.

The voice message acceptance block 56 accepts voice messages. In the present embodiment, the voice message acceptance block 56 accepts voice messages entered by the user through the microphone 16b for example.

The voice command identification block 58 identifies voice command data in command management data, the voice command data being indicated by a voice message accepted by the voice message acceptance block 56. In the present embodiment, in identifying voice command data on the basis of a voice message accepted by the voice message acceptance block 56, the voice command identification block 58 identifies the information represented by the accepted voice message by a known voice recognition processing technique. For example, when the voice message acceptance block 56 accepts a voice message within a predetermined volume range, equal to or higher than volume L and equal to or lower than volume H described before for example, the voice command identification block 58 identifies the timing concerned as the start timing of voice command identification. When the voice message acceptance block 56 continuously accepts voice messages lower in volume than volume L for a predetermined period of time, the voice command identification block 58 identifies the timing concerned as the end timing of voice command identification. The voice command identification block 58 then identifies the voice command data having a value that completely matches the recognition result of the voice message accepted from the voice command identification start timing to the voice command identification end timing. It should be noted that the voice command identification block 58 may identify the voice command data having a value that partially or completely matches a voice message recognition result. It should also be noted that the voice command identification block 58 may start the processing of narrowing voice command data candidates to be identified with the timing at which command identification started. When the end timing of command identification is identified, the voice command identification block 58 may determine the voice command data to be identified. In addition, if the volume of the accepted voice message is higher than volume H, voice command data identification is not executed. It should be noted that voice command data may be expressed by a phoneme sequence. The voice command identification block 58 resolves a voice message accepted by the voice message acceptance block 56 into a phoneme sequence so as to identify the voice command data indicative of the phoneme sequence related with the voice message concerned. Further, the voice command identification block 58 plays a role of a voice command recognition block configured to recognize a specific voice command, e.g. a magic word here, from the voice data obtained through the voice message acceptance block 56.

As described above, the voice command identification block 58 sometimes identifies doubly set voice command data.

The option identification block 60 identifies an option of attention and an alternative option from two or more options, two or more program icon images 32 in the present embodiment, in accordance with the acceptance of a voice message by the voice message acceptance block 56. When two or more pieces of voice command data are identified by the voice command identification block 58, the option identification block 60 identifies an option of attention and an alternative option from the program icon images 32 related with these two or more pieces of voice command data as described above. Here, on the basis of the value of an attribute related with an option, e.g. the timing with which a program related with the option is executed, the option identification block 60 may identify an option of attention and an alternative option. Also, the option identification block 60 may identify an option related with an option of attention as an alternative option, the option related with the option of attention being an option to be recommended to the user for example.

On the basis of a voice message received by the voice message acceptance block 56 or an operation accepted by the operation acceptance block 54, the command identification block 62 identifies a command related with the processing to be executed. A command as used here is not limited to that related with command information CI; namely, this command includes a command that puts the information processing apparatus 12 from a voice command input disabled state to a voice command input enabled state, for example.

The processing execution block 64 executes various kinds of processing operations, such as processing operations according to commands identified by the command identification block 62. For example, if a voice message accepted by the voice message acceptance block 56 is indicative of command information CI, then the processing execution block 64 executes a processing operation according to a command indicated by the command information concerned. It is also practicable for the processing execution block 64 to execute processing operations according to execution states of a program being executed, for example.

The arrangement determination rules data storage block 66 stores arrangement determination rules data used to determine the position, size, and contents of command information CI to be arranged on the screen. Referring to FIG. 20, there is schematically shown one example of arrangement determination rules data. In the arrangement determination rules data shown in FIG. 20, the position and size of the voice input guide image 38 to be arranged in the screen and the contents of the command information CI to be arranged in the voice input guide image 38 concerned are related with the screen display contents.

The command information arrangement block 68 arranges command information CI at a position in the screen suitable for the screen display contents. On the basis of screen display contents and arrangement determination rules data for example in the present embodiment, the command information arrangement block 68 determines the arrangement of the voice input guide image 38 with command information CI arranged.

It should be noted that the command information arrangement block 68 may control whether to arrange command information CI in accordance with screen display contents as described above. In this case, if voice command data indicative of a voice message accepted by the voice message acceptance block 56 exists regardless whether corresponding command information CI is arranged or not, the processing execution block 64 may execute the processing related with the voice command data. Also, for each piece of command information CI related with two or more pieces of voice command data, the command information arrangement block 68 may control whether to arrange the command information CI concerned in accordance with screen display contents. In this case, if a voice message received by the voice message acceptance block 56 is indicative of any one of the pieces of command information CI, then the processing execution block 64 may execute the processing corresponding to the command indicated by the command information CI concerned.

As described above, the command information arrangement block 68 may hide the display contents of an area on the screen having a size suitable for screen display contents and arrange command information CI in the area concerned. Also, when the play screen 42 is displayed, the command information arrangement block 68 may hide the display contents of an area on the screen smaller in size than that when the home screen 30 is displayed and arrange command information CI in the area concerned.

The screen generation block 70 generates a screen to be displayed; the home screen 30 or the play screen 42 for example. In the present embodiment, the screen generation block 70 generates a screen with a predetermined frame rate. The screen generation block 70 generates a screen with command information CI arranged in accordance with the arrangement determined by the command information arrangement block 68. In addition, if an option of attention and an alternative option are identified by the option identification block 60, the screen generation block 70 generates the home screen 30 on which the option of attention is highlighted and alternative option information AI indicative of a name related with an alternative option is arranged.

The command management block 72 updates command management data stored in the command management data storage block 52 in accordance with the processing executed by the processing execution block 64, a screen generated by the screen generation block 70 or the like.

The display control block 74 outputs data indicative of a screen generated by the screen generation block 70 to the display 14. In the present embodiment, every time the screen generation block 70 generates a screen with a predetermined frame rate, the display control block 74 outputs the data indicative of the generated screen to the display 14. The display 14 displays the screen corresponding to the data concerned. Thus, screens are shown on the display 14 with a predetermined frame rate.

When an option of attention and an alternative option are identified by the option identification block 60, the display control block 74 displays information indicative that an option of attention is selected and information indicative of a voice message by which the option identification block 60 identifies an alternative option as an option of attention when the voice message is accepted by the voice message acceptance block 56, for example. To be more specific, the display control block 74 displays information indicative that an option of attention is selected by displaying this option of attention larger in size than other options, for example. Also, the display control block 74 displays alternative option information AI indicative of the name corresponding to an alternative option.

If a specific voice command such as a magic word is recognized on a first screen, the display control block 74 displays a first menu including one or more voice commands; if the voice command concerned is recognized on a second screen, the display control block 74 displays a second menu including one or more voice commands. In the present embodiment, the above-mentioned first screen corresponds to the home screen 30 for example and the above-mentioned second screen corresponds to a screen generated by an application program being executed, such as the play screen 42. The above-mentioned first menu is equivalent to command information CI arranged in the home screen 30 for example and the above-mentioned second menu is equivalent to command information CI arranged in the play screen 42 for example. It should be noted that the first screen may be a system menu screen in which a system menu is displayed.

The first menu differs from the second menu in the position at which command information CI is displayed as described above. The second menu may be a subset of the first menu. For example, the command information CI displayed on the play screen 42 shown in FIG. 16 is a subset of the command information CI displayed on the home screen 30 shown in FIG. 14. As described above, a command of capturing screen display contents may be included in the first menu or the second menu.

Figure 21:
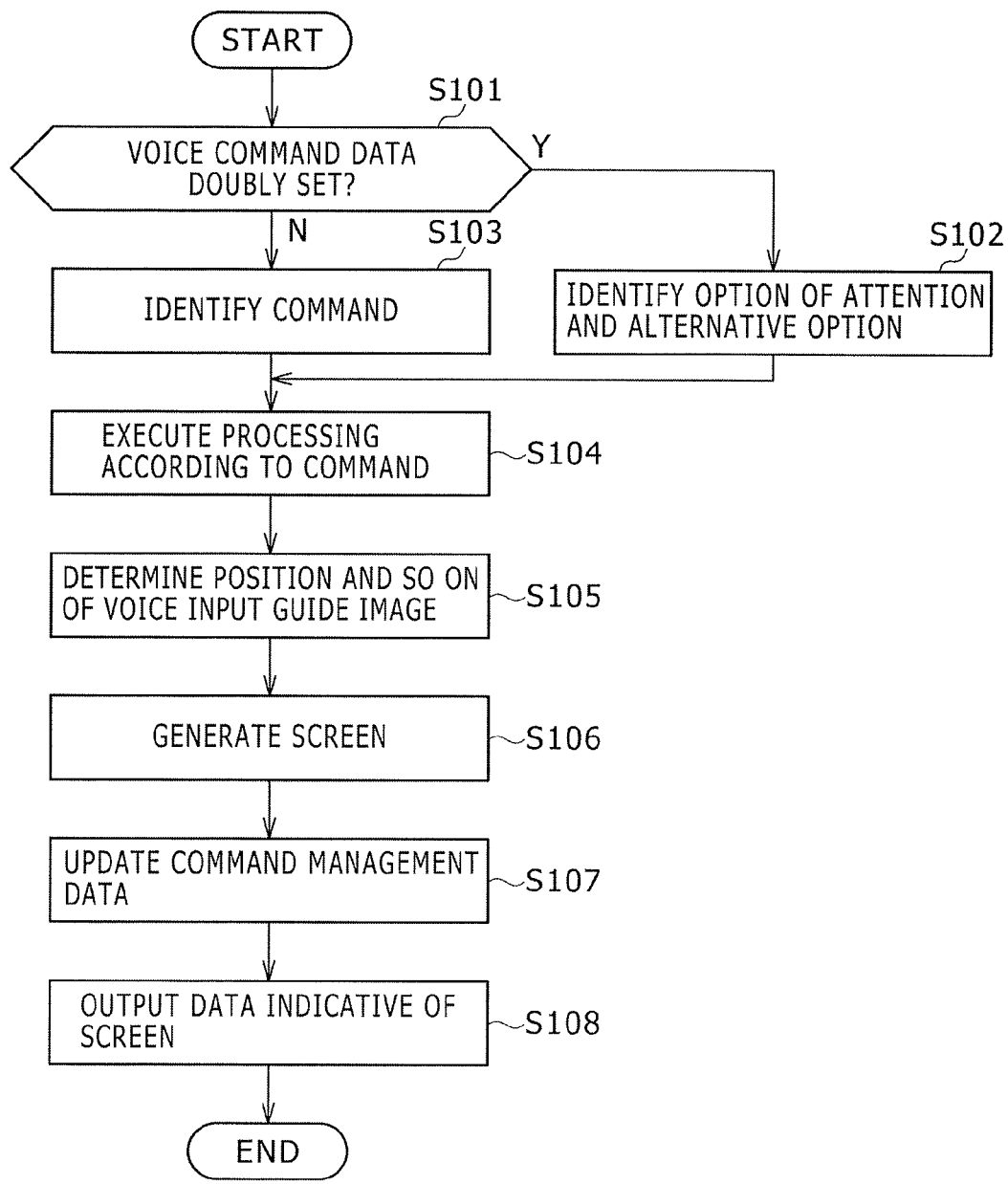
FIG. 21 is a flowchart indicative of one example of a flow of processing that is executed on the information processing apparatus according to the embodiment of the present disclosure.

The following describes, with reference to the flowchart shown in FIG. 21, one example of a processing flow that is executed in the information processing apparatus 12 according to the present embodiment, this processing being triggered by that at least one piece of voice command data has been identified on the basis of a voice message accepted by the voice command identification block 58.

Figure 22:
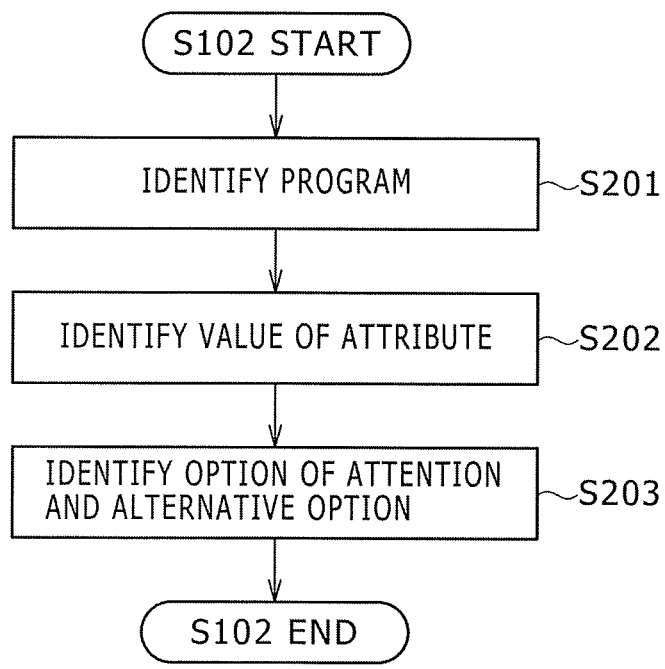
FIG. 22 is a flowchart indicative of another example of the flow of processing that is executed on the information processing apparatus according to the embodiment of the present disclosure.

First, when the voice command identification block 58 identifies voice command data, the option identification block 60 checks whether the identified voice command data is doubly set voice command data or not in the command management data (S101). If the voice command data concerned is found to be doubly set voice command data (Y in S101), then the option identification block 60 identifies an option of attention and an alternative option on the basis of a predetermined criterion (S102). One specific example of a processing flow in S102 will be described later with reference to FIG. 22. If the voice command data is found not to be doubly set voice command data (N in S101) or if options have been identified in the processing shown in S102, then the command identification block 62 identifies a command corresponding to the processing to be executed (S103). Then, the processing execution block 64 executes the processing corresponding to the command identified in the processing shown in S103 (S104).

Next, the command information arrangement block 68 determines the position, size, and contents of the voice input guide image 38 in the screen generated in accordance with the execution result of the processing corresponding to the command in the processing shown in S104 (S105). On the basis of the execution result of the command in the processing shown in S104 and the position, size, and contents of the voice input guide image 38 determined in the processing shown in S105, the screen generation block 70 generates a screen to be displayed (S106). Then, on the basis of the execution result of the processing shown in S104 and the screen generated by the processing shown in S106, the command management block 72 updates the command management data stored in the command management data storage block 52 (S107). Next, the display control block 74 outputs the data indicative of the screen generated by the processing shown in S107 to the display 14 (S108), upon which the processing shown in the present processing example comes to an end.

The following describes one specific example of the processing flow in the processing shown in S102 described above with reference to a flowchart shown in FIG. 22.

First, the option identification block 60 identifies a program related with each of pieces of doubly set voice command data (S201). In this example, the option identification block 60 identifies a program related with the program icon image 32 that is shown to be set as an option of attention or an alternative option in the processing contents data of the command management data shown in FIG. 10. Next, the option identification block 60 identifies the value of an attribute related with each program identified in the processing shown in S201 (S202). In the present processing example, the value of the last play date and time data about the program concerned is identified in the program management data.

On the basis of the value of the attribute identified in the processing shown in S202, the option identification block 60 identifies the program icon images 32 that provide an option of attention and an alternative option (S203), upon which the processing shown in this processing example comes to an end. Here, as described above for example, the program icon image 32 related with the program most recently executed is identified as an option of attention and the program icon image 32 related with the program second recently executed is identified as an alternative option.

As described above, when an option of attention and an alternative option are identified, the screen generation block 70 generates the home screen 30 in which the option of attention is highlighted and alternative option information AI indicative of the name related with an alternative option is arranged in the processing shown in S106.

While a preferred embodiment of the present disclosure has been described using specific terms, such description is for illustrative purpose only, and it is to be understood that changes and variations may be made without departing from the spirit or scope of the following claims.

For example, the information processing apparatus 12 may be a portable game apparatus having a camera 16a and a microphone 16b. Also, the information processing apparatus 12 may be a personal computer, a tablet terminal, or a smartphone, for example. In addition, the division of roles of the information processing apparatus 12, the display 14, and the camera-microphone unit 16 is not limited to that described above. Further, the information processing apparatus 12 may be configured by two or more housings.

It should be noted that the specific character strings described above and the specific character strings in the drawings are illustrative only and therefore not limited thereto.

The present disclosure contains subject matter related to that disclosed in Japanese Priority Patent Application JP 2013-232598 filed in the Japan Patent Office on Nov. 8, 2013, the entire content of which is hereby incorporated by reference.

What is claimed is:

1. A display control apparatus having a processor comprising:
   a voice message acceptance block configured to accept a voice message from a user through a microphone;
      wherein a plurality of options are associated with a plurality of voice messages, with at least two options associated with the same voice message, and
      wherein each option is associated with at least one attribute;
   an option identification block configured to identify using the processor, in accordance with acceptance of the voice message by the voice message acceptance block, selected options associated with the voice message;
      wherein, if two or more of the plurality of options are associated with the voice message, the option identification block selects an option of attention and an alternative option based upon a priority of attributes of the selected options,
      wherein an attribute associated with the option of attention has a higher priority than that of an attribute associated with the alternative option; and
   a display control block configured to concurrently
      display information indicative that the option of attention is in a selected state in a first region of a display and
      display information in a second region of the display indicative of an alternative voice message that is used to select the alternative option as the option of attention in accordance with the acceptance by the voice message acceptance block,
      wherein the alternative voice message is different than the voice message.

2. The display control apparatus according to claim 1, wherein a value of the attributes of the selected options is a value indicative of a timing with which a program related with the option was executed.

3. The display control apparatus according to claim 1, wherein the option identification block identifies, as the option of attention, an option related with a most recently executed program from among a plurality of options related with programs.

4. The display control apparatus according to claim 3, wherein the option identification block identifies, as the alternative option, an option related with a second recently executed program.

5. The display control apparatus according to claim 1, wherein the option identification block identifies, as the alternative option, an option related with the option of attention.

6. The display control apparatus according to claim 1, wherein the plurality of options associated with the plurality of voice messages are set by vendors related with a program associated with each of the plurality of options.

7. The display control apparatus according to claim 1, wherein the display control block displays information indicative that the option of attention is in a selected state by displaying the option of attention larger in size than alternative option.

8. A display control method comprising:
   accepting a voice message from a user through a microphone;
      wherein a plurality of options are associated with a plurality of voice messages, with at least two options associated with the same voice message, and
      wherein each option is associated with at least one attribute;
   identifying, using a processor, in accordance with acceptance of the voice message by the voice message acceptance block, selected options associated with the voice message;
      wherein, if two or more of the plurality of options are associated with the voice message, an option of attention and an alternative option are selected based upon a priority of attributes of the selected options,
      wherein an attribute associated with the option of attention has a higher priority than that of an attribute associated with the alternative option; and
   displaying information indicative that the option of attention is in a selected state in a first region of a display and
   displaying information in a second region of the display indicative of an alternative voice message that is used to select the alternative option as the option of attention in accordance with the acceptance of the voice message.

9. A non-transitory computer-readable information storage medium storing a program for a computer, the program including:
   accepting a voice message from a user through a microphone;
      wherein a plurality of options are associated with a plurality of voice messages, with at least two options associated with the same voice message, and
      wherein each option is associated with at least one attribute,
   identifying, using a processor, in accordance with acceptance of the voice message by the voice message acceptance block, selected options associated with the voice message;
      wherein, if two or more of the plurality of options are associated with the voice message, an option of attention and an alternative option are selected based upon a priority of attributes of the selected options,
      wherein an attribute associated with the option of attention has a higher priority than that of an attribute associated with the alternative option, and
   displaying information indicative that the option of attention is in a selected state in a first region of a display and displaying information in a second region of the display indicative of an alternative voice message that is used to select the alternative option as the option of attention in accordance with the acceptance of the voice message.

* * * * *